United States Patent
Krone

(10) Patent No.: US 12,208,834 B2
(45) Date of Patent: Jan. 28, 2025

(54) SYSTEMS AND METHODS FOR MACHINE STEERING

(71) Applicant: Caterpillar Inc., Peoria, IL (US)

(72) Inventor: Bradley P. Krone, Dunlap, IL (US)

(73) Assignee: Caterpillar Inc., Peoria, IL (US)

(*) Notice: Subject to any disclaimer, the term of this patent is extended or adjusted under 35 U.S.C. 154(b) by 246 days.

(21) Appl. No.: 17/709,822

(22) Filed: Mar. 31, 2022

(65) Prior Publication Data
US 2023/0311988 A1 Oct. 5, 2023

(51) Int. Cl.
B62D 15/00 (2006.01)
B62D 1/04 (2006.01)
B62D 11/00 (2006.01)
B62D 11/06 (2006.01)
B62D 15/02 (2006.01)

(52) U.S. Cl.
CPC ............ B62D 15/025 (2013.01); B62D 1/04 (2013.01); B62D 11/003 (2013.01); B62D 11/06 (2013.01)

(58) Field of Classification Search
CPC ...... B62D 15/025; B62D 1/04; B62D 11/003; B62D 11/06; B62D 11/006; B62D 6/003
See application file for complete search history.

(56) References Cited

U.S. PATENT DOCUMENTS

| | | | | |
|---|---|---|---|---|
| 3,580,352 A * | 5/1971 | Hestad | ................... | B62D 5/006 180/443 |
| 4,741,409 A * | 5/1988 | Westercamp | ............ | B62D 7/09 180/413 |
| 5,000,650 A * | 3/1991 | Brewer | .................... | E02F 3/434 172/812 |
| 5,925,082 A | 7/1999 | Shimizu et al. | | |
| 7,460,942 B2 * | 12/2008 | Mailer | ................. | A01B 79/005 701/50 |
| 8,649,930 B2 * | 2/2014 | Reeve | ...................... | B62D 1/02 701/472 |
| 9,604,670 B2 | 3/2017 | Taniguchi | | |
| 2005/0126145 A1 * | 6/2005 | Hunt | .................... | B62D 11/003 56/11.9 |
| 2009/0033053 A1 * | 2/2009 | Markiton | ............. | B62D 15/021 280/93.5 |
| 2009/0065273 A1 * | 3/2009 | Wyatt | .................... | A01D 34/78 180/65.8 |

(Continued)

FOREIGN PATENT DOCUMENTS

| | | | |
|---|---|---|---|
| JP | 6705686 B2 | 6/2020 | |
| JP | 6928571 B2 | 9/2021 | |

(Continued)

Primary Examiner — Phutthiwat Wongwian
Assistant Examiner — Sherman D Manley

(57) ABSTRACT

A method for steering correction in a mobile machine having at least one ground-engaging device including one or more tracks or one or more wheels includes detecting a steering request with an electronic control unit, the steering request being generated by an input device configured to control steering of the mobile machine. The method also includes determining that the steering request is a request to propel the mobile machine in a straight path and determining, during travel of the machine, an amount of deviation of the mobile machine from the straight path. The method further includes generating an adjusted steering command based on the amount of deviation from the straight path.

20 Claims, 4 Drawing Sheets

(56) References Cited

U.S. PATENT DOCUMENTS

| | | | |
|---|---|---|---|
| 2009/0166124 A1* | 7/2009 | Bauer | B63H 25/02 |
| | | | 701/41 |
| 2016/0214643 A1* | 7/2016 | Joughin | G05D 1/0278 |
| 2021/0240192 A1* | 8/2021 | Zhang | G05D 1/0891 |
| 2022/0007563 A1* | 1/2022 | Suga | G05D 1/648 |
| 2023/0069372 A1* | 3/2023 | Morimoto | G05D 1/0219 |
| 2024/0092161 A1* | 3/2024 | Alberda | B60K 11/04 |

FOREIGN PATENT DOCUMENTS

| | | |
|---|---|---|
| WO | 9803738 A1 | 1/1998 |
| WO | 2019054057 A1 | 3/2019 |

\* cited by examiner

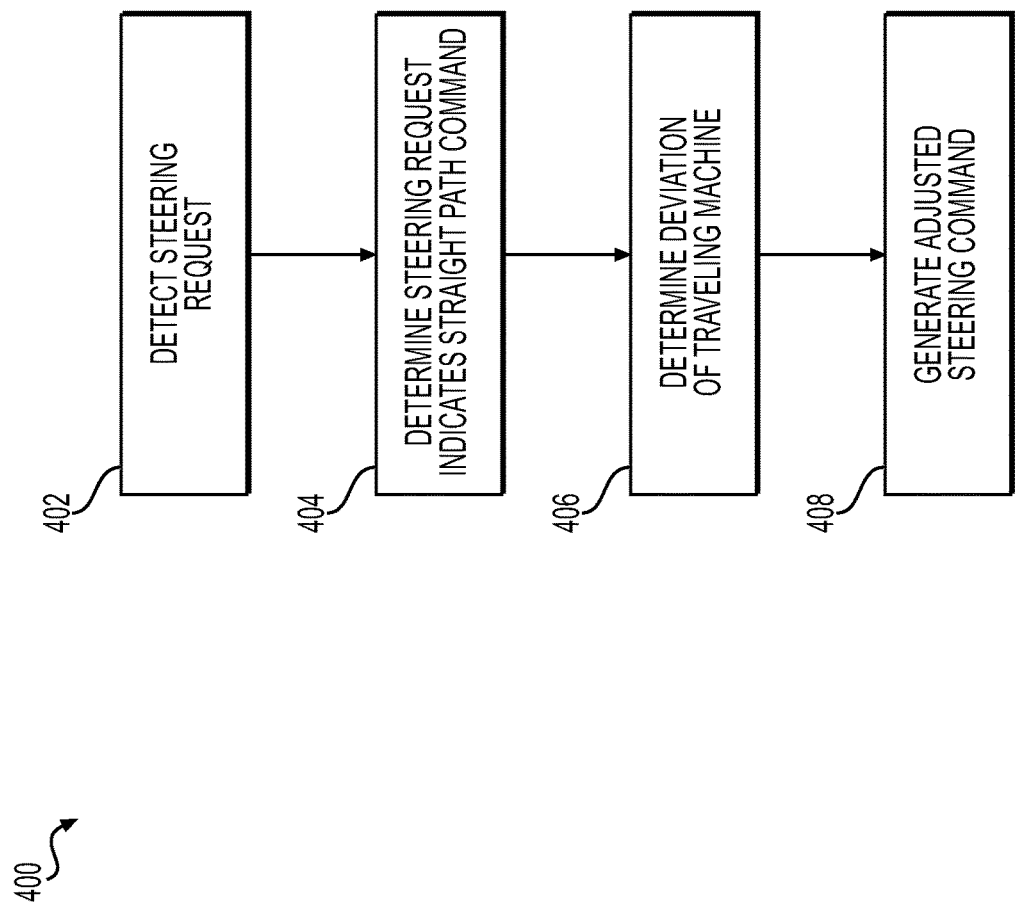

SYSTEMS AND METHODS FOR MACHINE STEERING

TECHNICAL FIELD

The present disclosure relates generally to methods and systems for steering systems and, more particularly, to systems and methods for steering assistance or steering correction in a mobile machine.

BACKGROUND

Machines, including earthmoving machines such as tractors, motor graders, excavators, hauling trucks, and others, are useful for various types of work including breaking up, leveling, separating, or moving different types of material. These machines operate in challenging off-road environments which frequently include obstacles, steep inclines, irregular material distribution, and other conditions that can impair the ability of the machine to travel in straight direction. Whether controlled on-site by an operator located within a cabin of the machine, or controlled remotely by the use of computer systems and high-speed networks, machines frequently travel in approximately straight directions to efficiently move material, perform grading, etc.

These machines can be commanded to travel in a straight line by providing inputs with a steering wheel, joystick, or other device. However, influences outside of the machine or within the machine can cause the machine to deviate from a straight travel path. For example, the machine itself can have uneven track tensions, tire pressures, and hydraulic inefficiencies that cause the machine to veer from a straight path. Outside of the machine, sloped surfaces, material that is unevenly loaded on an implement, and soil irregularities can further contribute to steering difficulties.

An autonomous vehicle is described in WO 2019/054057 A1 ("the '057 publication") to Kodama. The autonomous vehicle described in the '057 publication travels according to a target route that is generated in advance. The vehicle includes a steering angle sensor that facilitates automatic steering of the machine along a target route. While the vehicle described in the '057 publication may be useful to facilitate guidance of autonomous vehicles, it may be unable to correct steering in a manually-operated machine or vehicle.

The systems and methods of the present disclosure may solve one or more of the problems set forth above and/or other problems in the art. The scope of the current disclosure, however, is defined by the attached claims, and not by the ability to solve any specific problem.

SUMMARY

In one aspect, a method for steering correction in a mobile machine having at least one ground-engaging device including one or more tracks or one or more wheels may include detecting a steering request with an electronic control unit, the steering request being generated by an input device configured to control steering of the mobile machine. The method may also include determining that the steering request is a request to propel the mobile machine in a straight path and determining, during travel of the machine, an amount of deviation of the mobile machine from the straight path. The method may further include generating an adjusted steering command based on the amount of deviation from the straight path.

In another aspect, a method for steering correction while propelling a mobile machine in a straight-line mode may include receiving a request to direct the mobile machine in a straight direction and enabling the straight-line mode based on the request. The method may also include determining, based on a signal from an orientation sensor, a deviation from the straight direction and generating an adjusted steering command during the straight-line mode while the mobile machine is being manually operated.

In yet another aspect, a machine steering system may include a mobile machine having a ground-engaging device and an implement. The machine steering system may also include an orientation sensor connected to the mobile machine, and an electronic steering correction device. The electronic steering correction device may be configured to receive a steering command to cause the mobile machine to steer in a straight direction, and receive, from the orientation sensor, orientation data including an orientation of the machine. The electronic steering correction device may be further configured to determine, based on the steering command and the orientation data, that the machine has deviated from the straight direction, and to generate, based on determining that the machine has deviated from the straight direction, an adjusted steering command to cause the mobile machine to steer in a straight direction.

BRIEF DESCRIPTION OF THE DRAWINGS

FIG. 4 is a flowchart depicting an exemplary method for steering correction of a mobile machine, according to aspects of the disclosure.

DETAILED DESCRIPTION

Both the foregoing general description and the following detailed description are exemplary and explanatory only and are not restrictive of the features, as claimed. As used herein, the terms "comprises," "comprising," "having," "including," or other variations thereof, are intended to cover a non-exclusive inclusion such that a method or apparatus that comprises a list of elements does not include only those elements, but may include other elements not expressly listed or inherent to such a method or apparatus. In this disclosure, relative terms, such as, for example, "about," "substantially," "generally," and "approximately" are used to indicate a possible variation of ±10% in the stated value or characteristic.

Figure 1:
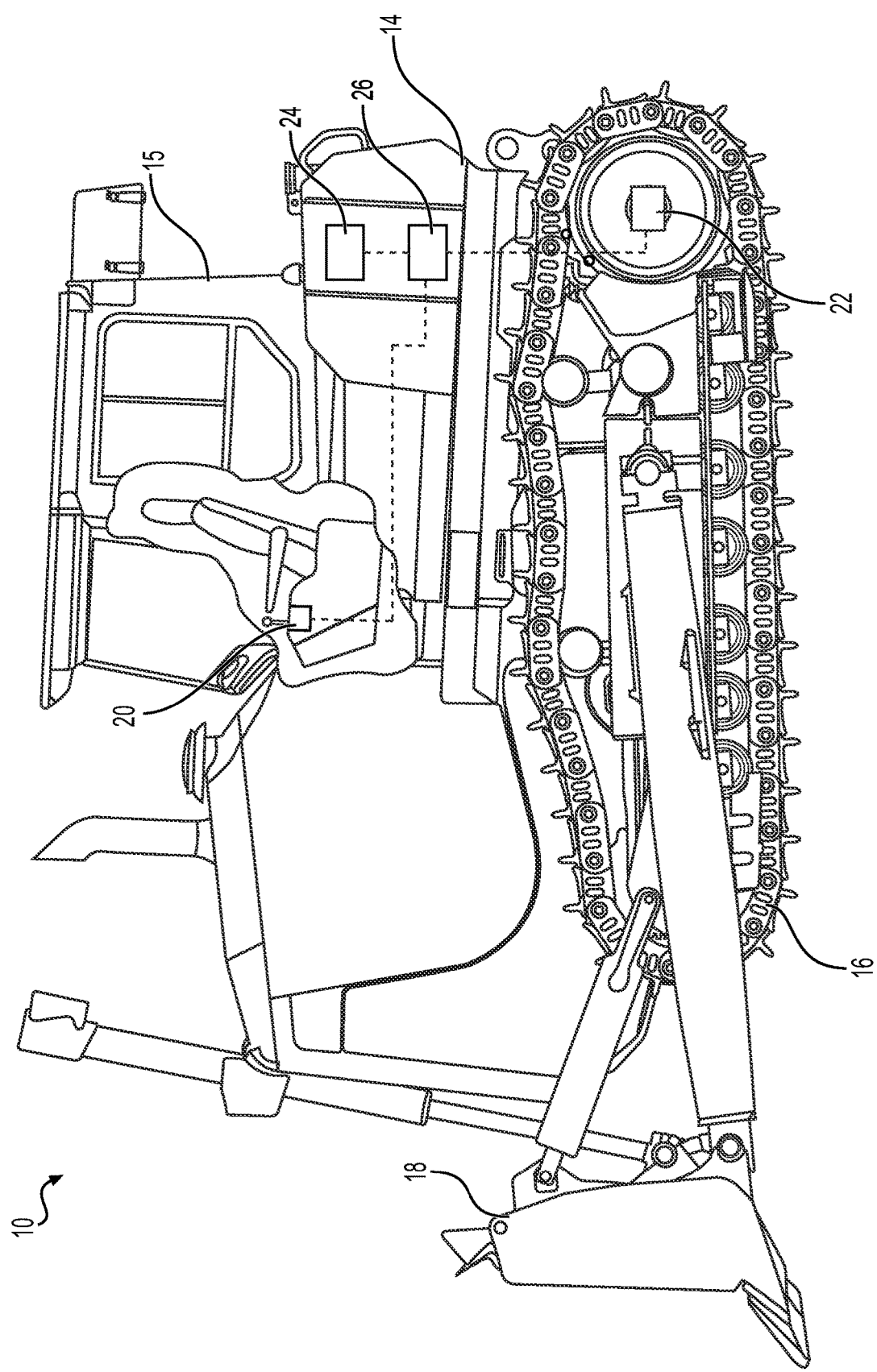
FIG. 1 is a schematic side view of a machine steering system, according to aspects of the disclosure.

FIG. 1 illustrates an exemplary machine steering system 10 for straight-line steering assistance of a mobile machine 12. Machine steering system 10 may include machine 12, such as a track-type tractor, excavator, hauling truck, or other machine useful for performing work and/or off-highway travel, an orientation sensor such as a yaw rate sensor 22 and/or a position sensor 24, and an electronic steering assistance device 26 (also referred to herein as a steering correction device) for generating steering commands in response to inputs provided by an operator of machine 12 and based on one or more sensors of steering system 10.

Machine 12 may include a frame 14 connected to a chassis that supports machine 12 on one or more ground-engaging devices 16 such as tracks (shown in FIG. 1) or wheels. Machine 12 may also include an operator cabin 15 having one or more input devices 20, an implement 18 such as a bucket, blade, ripper, dump body, etc., a positioning system for moving implement 18 (e.g., a hydraulic system, a pneumatic system, etc.), and an energy source that provides propulsion power for machine 12, such as an internal combustion engine, a fuel cell, an energy storage device (one or more battery packs), etc.

Machine 12 may be configured for manual operation in which components of machine 12 respond to inputs generated by an operator. As used herein "manual" operation includes control of machine 12 by an operator physically located within cabin 15, or remote operation in which an operator is located outside of cabin 15 and controls the machine with the use of one or more remote input devices 20 located outside of machine 12, such as at an off-site location. These remote input devices 20 may be connected to machine 12 over a wired or wireless network via one or more computing systems and, if desired, may simulate an input device 20 that is present in cabin 15.

Whether machine 12 is manually operated from within cabin 15 or from outside of machine 12, machine 12 may be configured to receive a steering command. When controlled or operated from within cabin 15, the steering command may be received from input device 20. Input device 20 may include a joystick (shown in FIG. 1), a foot-pedal, a lever, or a steering wheel. If desired, input device 20 may include other devices, such as a touch screen interface, one or more physical buttons, switches, etc. Input device 20 may be configured to generate a command, or request, to direct the machine in a straight path. When input device 20 is a joystick or steering wheel, this request may correspond to a neutral position of the joystick or wheel and/or the absence of a change to the position of input device 20. Additionally or alternatively, input device 20 may include one or more buttons or switches that, when actuated, generate a command or request to direct the machine in a straight path.

Figure 2:
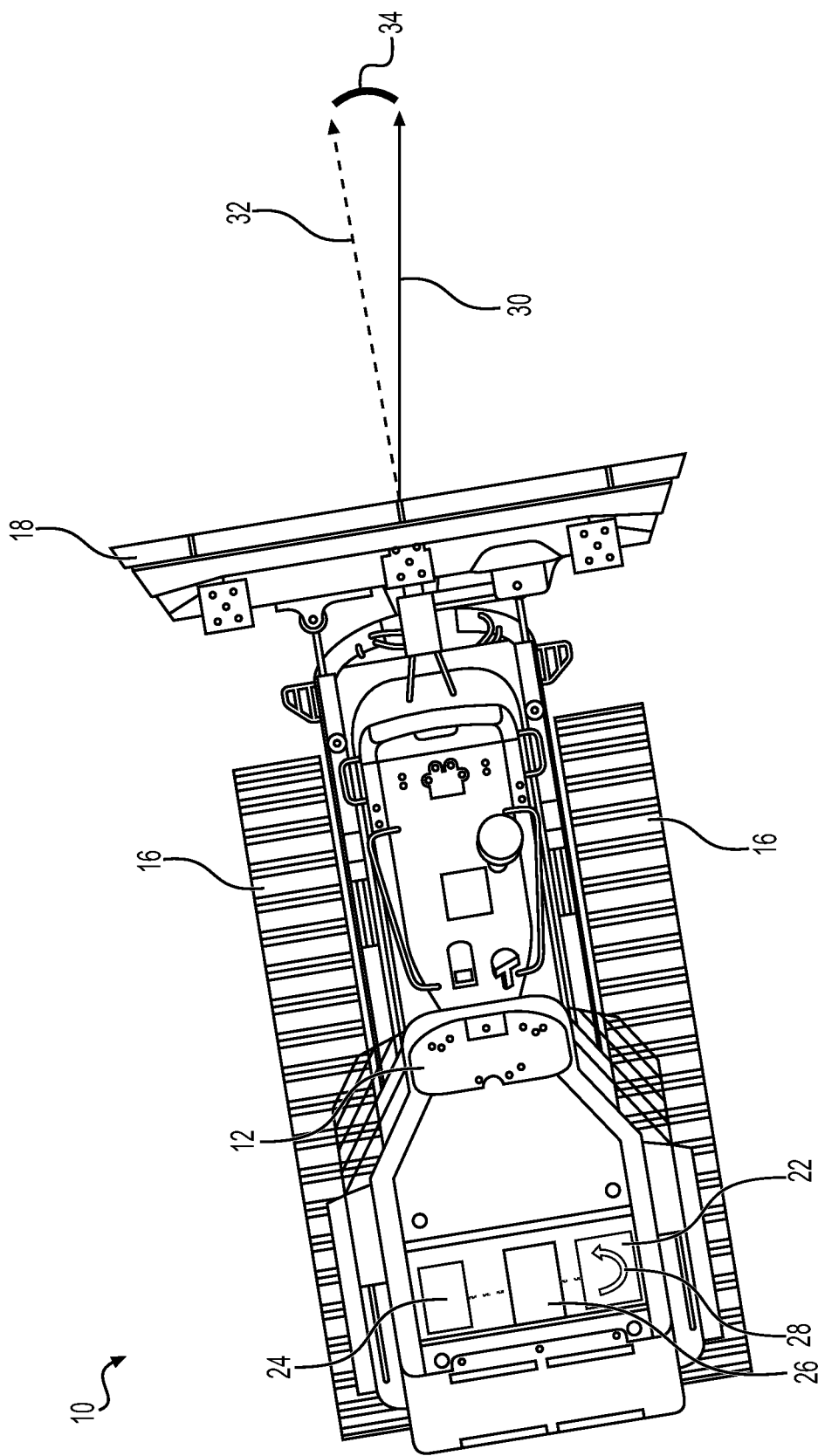
FIG. 2 is a schematic top view of the machine steering system of FIG. 1.

FIG. 2 is a top view of machine steering system 10, illustrating machine 12 traveling on a worksite. Machine 12 may include at least one ground-engaging device 16 that is responsive to commands issued by input device 20 to steer machine 12 in a desired direction 30. When ground-engaging device 16 includes tracks, as shown in FIGS. 1 and 2, the steering direction of machine 12 may be controlled by setting and/or adjusting the speeds of the individual tracks. In embodiments where machine 12 includes wheels, the wheels may be repositioned to control the direction of travel of machine 12.

System 10 may include one or more components for monitoring a steering direction of machine 12, represented as an actual steering direction 32, and for monitoring an actual orientation of machine 12. These components of system 10, which may include an orientation sensor (yaw rate sensor 22 and/or position sensor 24) and steering assistance device 26, may enable detection of actual direction 32 for comparison to a requested or desired orientation or direction 30 set with input device 20, to determine a steering error 34.

When the orientation sensor of system 10 includes yaw rate sensor 22, yaw rate sensor 22 may be located within frame 14. In particular, yaw rate sensor 22 may be connected to a chassis of machine 12. Yaw rate sensor 22 may be included in group of sensors, such as a group of sensors of an inertial measurement unit ("IMU"). An IMU may contain a plurality of inertial sensors, one or more of these sensors being a yaw rate sensor (e.g., a sensor configured to detect changes in position about a vertical axis). The yaw rate (velocity of movement around an axis extending vertically through machine 12) measured by sensor 22 may be changes in yaw over a predetermined period of time. These changes in yaw may be measured with one or more Coriolis elements. In particular, yaw rate sensor 22 may be configured to detect the rate of rotation, or yaw 28, about a vertical axis, and in particular, a yaw 28 of machine 12 that can be represented in radians or degrees per second. If desired, yaw rate sensor 22 may be a standalone sensor (e.g., a sensor that only measures rotation about a vertical axis).

When the orientation sensor of system 10 includes position sensor 24, position sensor 24 may be configured to determine an instantaneous rotational position of machine 12. In one configuration, position sensor 24 may include a global navigation satellite system (GNSS) receiver or a global positioning system receiver that is configured to monitor a position of machine 12 over time. Position sensor 24 may enable steering assistance device 26 to receive a plurality of positions or orientations of machine 12 over a period of time during which machine 12 receives a request to travel in a straight direction.

While the orientation sensor may include yaw rate sensor 22, position sensor 24, or both, as described above, other types of sensors may be configured to identify disturbances that cause a change in the yaw of machine 12. For example, the orientation sensor may include one or more vision devices (e.g., a stereo camera system), LIDAR, radar, etc. A vision device, LIDAR, radar, or other observation system may enable detection of the position of one object or surface, or a plurality of objects or surfaces. By monitoring apparent changes in the position of stationary objects or surfaces, the vision device or other orientation sensor may enable identification of a change in orientation of machine 12, as compared to these stationary objects or surfaces.

Steering assistance device 26 may be an electronic control unit programmed to receive inputs and control one or more aspects of machine 12. While steering assistance device 26 may be a standalone device that is configured to generate a command for adjusting steering of machine 12, steering assistance device 26 may be configured to control other aspects of machine system 10. For example, steering assistance device 26 may be part or an electronic control module that is configured to control an internal combustion engine of machine system 10, a position for positioning implement 18, or other components of machine system 10.

Steering assistance device 26 may be enabled, via programming, to generate outputs (e.g., steering command adjustment 128 shown in FIG. 3) for counteracting disturbances encountered by machine 12 when machine 12 operates in a straight-line mode. Steering assistance device 26 may be configured to receive signal(s) output from the orientation sensor, such as orientation data, and, based on the received signal(s), identify changes in orientation that cause a change in the yaw rate of machine 12. In an exemplary configuration, steering assistance device 26 may be configured to identify steering disturbances, such as changes in an orientation of machine 12 in the absence of a request to change the orientation of machine 12. In some configurations, steering assistance device 26 may identify a change in orientation and/or a steering disturbance based on a yaw rate (e.g., a rate of change of yaw 28 detected with yaw rate sensor 22), or, if desired, a change in yaw 28 measured with position sensor 24. Based on the yaw rate, position, and/or other information received by steering assistance device 26, steering assistance device 26 may generate an output to control the steering of machine 12 in a manner that counteracts the steering disturbance, thereby correcting steering without the need of an operator to manually counteract the steering disturbance by interacting with input device 20.

Figure 3:
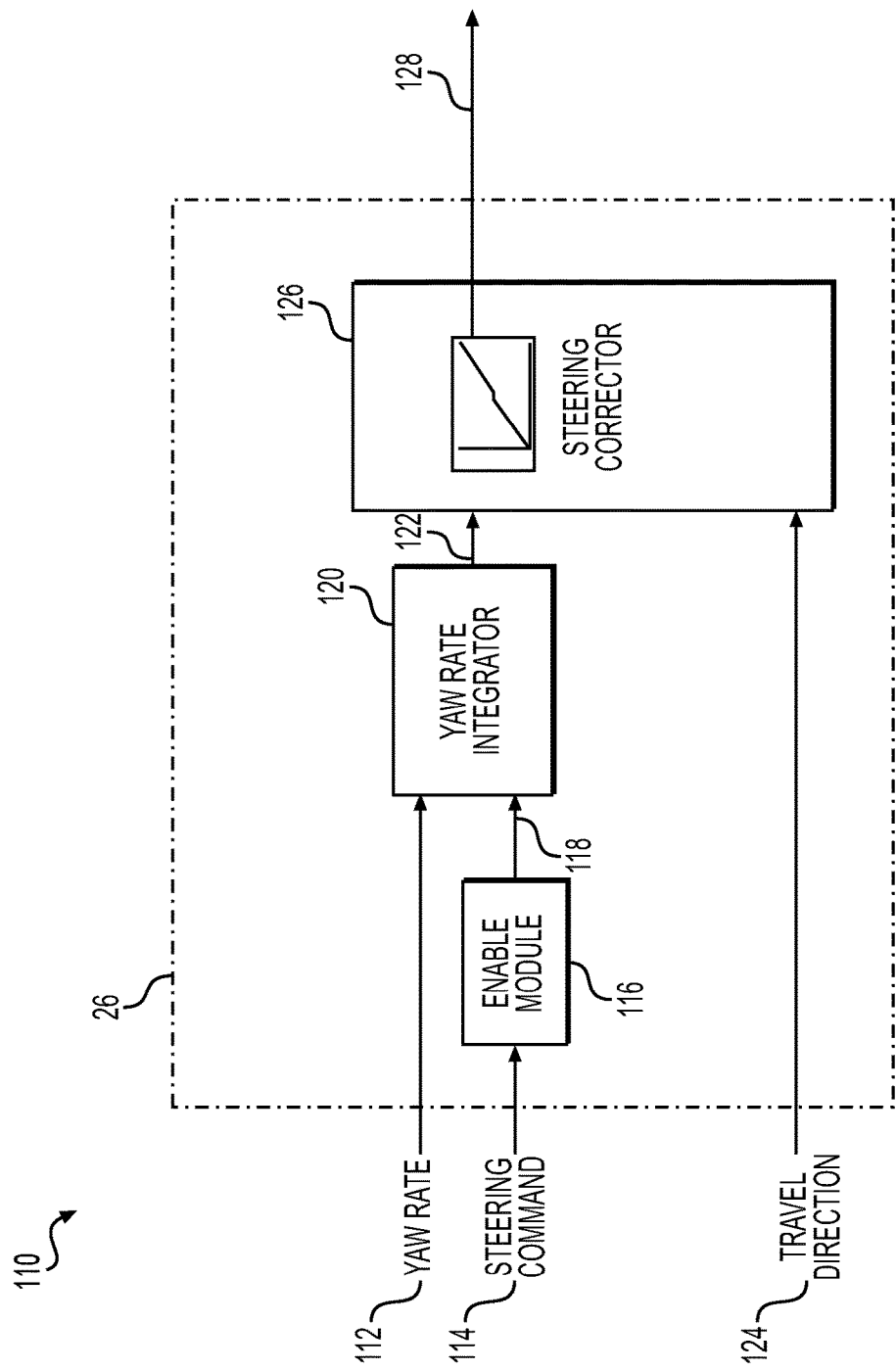
FIG. 3 is a block diagram of an electronic control device, such as a steering assistance device, according to aspects of the disclosure.

FIG. 3 is a block diagram representing an exemplary configuration of steering correction device 26. Steering correction device 26 may be a control unit embodying a single microprocessor or multiple microprocessors that receive inputs (e.g., yaw rate 112, steering command 114, and travel direction 124), and generate outputs (e.g., steering command adjustment 128). Steering correction device 26 may include a memory, a secondary storage device, a processor such as a central processing unit, or any other means for accomplishing a task consistent with the present disclosure. The memory or secondary storage device associated with steering correction device 26 may store data and software to allow steering correction device 26 to perform its functions, including the functions described with respect to FIG. 3 and one or more steps of method 400, as described below. Numerous commercially available microprocessors can be configured to perform the functions of steering correction device 26. Various other known circuits may be associated with steering correction device 26, including signal-conditioning circuitry, communication circuitry (e.g., for enabling remote control of machine 12), and other appropriate circuitry.

As shown in FIG. 3, steering correction device 26 may receive, as inputs 110, a yaw rate signal 112, a steering command signal 114, and a travel direction signal 124. Yaw rate signal 112 may indicate an instantaneous yaw rate, a yaw rate over a predetermined period of time, or particular change in yaw over a predetermined period of time, each of which can represent an amount of deviation of machine 12. Yaw rate signal 112 may include another signal indicative of a steering disturbance that changes the orientation (e.g., yaw) of machine 12 this signal also representing an amount of deviation of machine 12. In an exemplary configuration, yaw rate signal 112 may be generated by yaw rate sensor 22 and may provide orientation data that is received by steering correction device 26. However, yaw rate signal 112 may instead be a calculated yaw rate based on a type of orientation sensor other than a yaw rate sensor, such as position sensor 24. Steering command 114 may be generated with input device 20, either in cabin 15 or at a remote location outside of machine 12. Travel direction signal 124 may be received by steering correction device 26 to indicate a direction of travel of machine 12, such as a forward direction or a reverse direction. Travel direction signal 124 may correspond to the position of a forward-neutral-reverse or "FNR" lever to indicate a requested direction of travel to steering correction device 26.

An enable module 116 of steering correction device 26 may be configured to determine when steering correction device 26 is permitted to enter a steering assist mode, also referred to herein as a "straight line mode," during which steering correction device 26 is enabled to generate steering corrections. Enable module 116 may be configured to generate an enable signal 118 for permitting the straight line mode. Enable signal 118 may be received by a yaw rate integrator 120 which, in response to the enable signal 118, generates a yaw error 122. While signal 118 is described as an enable signal, if desired, signal 118 may instead be a disable signal that causes yaw rate integrator 120 to cease outputting yaw error 122. Yaw rate integrator 120 may be configured to receive yaw rate signal 112 and integrate the yaw rate to generate a yaw error 122. Yaw error 122 may represent a positional error, or a heading error, corresponding to the deviation of machine 12 from a straight path, this positional error being instantaneous or corresponding to the predetermined or incremental period of time.

Steering corrector 126 may receive yaw error 122 and travel direction signal 124 and, based on these signals, generate a suitable steering command adjustment 128. Steering corrector 126 may be configured to determine the magnitude of steering error (e.g., steering error 34 shown in FIG. 2) between a current heading or orientation of machine 12 (e.g., actual direction 32) and the last direction requested by an operator (e.g., desired direction 30). Steering corrector 126 may receive yaw error 122 representing an instantaneous or incremental yaw error. Steering corrector 126 may be configured to accumulate a plurality of instantaneous or incremental yaw errors 122 to calculate a current steering error 34 (FIG. 2), which corresponds to the current, accumulated, steering error. Thus, steering corrector 126 may enable steering correction device 26 to monitor changes between desired direction 30 and actual direction 32 over time.

Steering corrector 126 may calculate a command for returning machine 12 towards desired direction 30 based on a magnitude and direction of steering error 34. For example, steering corrector 126 may determine a steering command adjustment 128 by retrieving a value from one or more maps, look-up tables, or other data storage structures that permit steering corrector 126 to generate steering command adjustment 128. Steering command adjustment 128 may modify the operation of ground-engaging devices 16, such as by adjusting a speed of a track relative to another track or adjusting an angular position of one or more wheels. In particular, steering corrector 126 may calculate steering error 34 in the form of an angular offset, such as a number of degrees, and multiply this steering error 34 by a gain to calculate the direction and magnitude for steering command adjustment 128. Steering command adjustment 128 may be provided to another controller (e.g., a PID controller) or may be output to an actuator that alters the speed and/or position of ground-engaging devices 16 to seek a steering error of zero.

In some aspects, steering corrector 126 may include safeguards to prevent large steering corrections. For example, when yaw rate 112, yaw error 122, or an accumulated steering error 34 exceeds a predetermined threshold, steering command adjustment 128 may be limited to a predetermined maximum value. Thus, the maximum amount of adjustment permitted by steering corrector 126 may be limited. Additionally or alternatively, steering corrector 126 may be disabled when one or more of yaw rate signal 112, yaw error 122, or steering error 34 exceeds a maximum permitted value.

INDUSTRIAL APPLICABILITY

System 10 may be useful in any machine 12 that is configured for manual operation by an on-site and/or remote user. Suitable machines 12 may include machines such as track-type tractors, motor graders, excavators, hauling trucks, etc., having tracks or wheels that propel the machine in response to commands issued during this manual operation. Machine 12 may be propelled by any suitable power-generation device, such as an internal combustion engine, fuel cell, battery pack, etc.

With reference to FIG. 4, a method 400 for steering correction may be performed during the operation of machine 12, and in particular, when machine 12 travels in a worksite. Method 400 may be performed continuously during propulsion of machine 12, or intermittently during propulsion of machine 12. Machine 12 may be propelled during method 400 in response to a request from an operator within cabin 15 or a remotely-positioned operator manually operating machine 12 by interacting with an input device 20 such as a foot pedal, lever, button(s), etc. Method 400 may include performing work with machine 12 while machine 12 is propelled. In examples where machine 12 is an earthmoving machine, this work may involve transporting material or grading material by engaging material with an implement 18 in the form of a blade or bucket. However, method 400 may also be performed without performing work, such as when implement 18 is actuated to a raised position. Method 400 may enable steering adjustment or correction when machine 12 is manually operated, regardless of whether machine 12 is performing work or travelling without performing work.

A step 402 of method 400 may include detecting a steering request with steering correction device 26. This steering request may be a request to travel in a straight direction. As an example, step 402 may include detecting (e.g., receiving) a steering command 114 generated with one or more input devices 20. Steering command 114 may correspond to a neutral position of input device 20, or may be generated by interacting with a switch, button, touch-screen interface, or other suitable device for requesting straight-line travel. During the straight-line mode, steering command 114 may indicate the absence of a request to steer machine 12 away from a straight direction.

In step 404, enable module 116 may determine that the steering request detected in step 402 reflects a request to propel machine 12 in a straight direction. When input device 20 is a joystick, enable module 116 may generate an enable signal 118 that indicates straight-line travel when the joystick remains in a neutral position with respect to a left-right direction of machine 12. Enable signal 118 may cause steering corrector 126 of steering correction device 26 to enter a steering assist mode, and in particular, a straight-line mode.

A step 406 may include determining a deviation of machine 12 from a desired direction. For example, as described above, yaw rate integrator 120 may receive yaw rate signal 112, which constitutes orientation data and that is integrated or otherwise transformed to calculate yaw error 122, representing an instantaneous deviation or a deviation measured during a predetermined period of time (e.g., by sampling yaw rate signal 112).

A step 408 may include generating an adjusted steering command, such as steering command adjustment 128. The steering command adjustment 128 may correct the current steering error 34 and seek a steering error of zero. When steering correction device 26 is included in a system 10 for a track-type machine, as shown in FIG. 1, steering command adjustment 128 may cause a modification in the speed of one track with respect to another. In machines that include wheels, steering command adjustment 128 may cause a change in the angle of the wheels with respect to frame 14 of the machine.

In addition to steps 402, 404, 406, and 408, method 400 may include one or more steps or actions for disabling the straight-line mode and/or limiting the corrections permitted during the straight-line mode. For example, when input device 20 is in a position that requests a turn, enable module will not generate enable signal 118, and can disable the straight-line mode. Upon detecting a turn, steering corrector 126 may also reset any accumulated yaw error 122. In some aspects, steering correction device 26 may be programmed with a so-called "dead zone" such that inadvertent or other slight movements of input device 20 do not disrupt the operation of steering correction device 26 when in straight-line mode.

Method 400 may also include taking one or more actions to facilitate consistent operation of the straight-line mode. For example, when a straight-line mode is entered and subsequently terminated (e.g., when input device 20 is manipulated in a manner that requests a turn), steering correction device 26 may wait a minimum period of time before permitting another entry into the straight-line mode. For example enable module 116 may apply a "timeout" period before generating enable signal 118 to enable a subsequent entry into the straight-line mode.

While steps 402, 404, 406, and 408 have been described in an exemplary sequence, as understood, one or more of these steps may be performed simultaneously or performed and/or repeated in a different order. Moreover, any two or more of these steps may be performed simultaneously and/or at overlapping periods of time.

The disclosed system and method may facilitate straight-line propulsion of a machine, even when the machine encounters a disturbance that tends to cause the machine to deviate from an intended straight-line path. The system and method may facilitate maintenance of a straight line trajectory when the machine encounters an external disturbance such as a sloped surface, uneven implement (e.g., blade) load, or different soil properties on opposite sides of the machine. Additionally, the system and method may enable the machine to travel along and maintain a straight path when internal disturbances exist, such as left and right tracks that have different track tensions, left and right tires that have different tire pressures, or inefficiencies in a hydraulic system that tend to cause the machine to veer to the left or to the right. The system and method may enable the machine to traverse a straight path, even when one or more external and/or internal disturbances act to disrupt the linear travel of the machine.

It will be apparent to those skilled in the art that various modifications and variations can be made to the disclosed system and method without departing from the scope of the disclosure. Other embodiments of the system and method will be apparent to those skilled in the art from consideration of the specification and system and method disclosed herein. It is intended that the specification and examples be considered as exemplary only, with a true scope of the disclosure being indicated by the following claims and their equivalents.

What is claimed is:

1. A method for steering correction in a mobile machine having at least one ground-engaging device including one or more tracks or one or more wheels, the method comprising:
    detecting a steering request with an electronic control unit, the steering request being generated by movement by an operator of an input device configured to control steering of the mobile machine;
    determining that the steering request is a request to propel the mobile machine in a straight path;
    determining, during travel of the machine, an amount of deviation of the mobile machine from the straight path; and
    generating, with a steering assistance device, an adjusted steering command based on the amount of deviation from the straight path, wherein the adjusted steering command causes a change in an orientation of the mobile machine while a position of the input device remains in a neutral position in which the input device is not moved.

2. The method of claim 1, wherein the steering request corresponds to a different position of the input device indicative of a desire to maintain the straight path, and the input device is located within a cabin of the mobile machine.

3. The method of claim 1, wherein the deviation of the mobile machine is detected with a sensor connected to a chassis of the mobile machine.

4. The method of claim 3, wherein the sensor is a yaw rate sensor.

5. The method of claim 1, wherein the amount of deviation of the mobile machine represents a difference between an actual orientation of the mobile machine and a requested orientation of the mobile machine.

6. The method of claim 1, wherein an implement of the mobile machine engages material while the mobile machine is travelling.

7. The method of claim 1, wherein the neutral position of the input device is with respect to a left-right direction of the mobile machine.

8. The method of claim 1, wherein the input device includes at least one of a joystick, a lever, a foot pedal, or a steering wheel.

9. A method for steering correction while propelling a mobile machine in a straight-line mode, the method comprising:
   receiving, based on a position of an input device that is moved by a user to steer the mobile machine, a request to direct the mobile machine in a straight direction;
   enabling the straight-line mode based on the request;
   determining, based on a signal from an orientation sensor, a deviation from the straight direction; and
   generating, with a steering control unit, an adjusted steering command during the straight-line mode while the mobile machine is being manually operated,
   wherein the adjusted steering command causes a change in an orientation of the mobile machine without a corresponding movement of the input device.

10. The method of claim 9, wherein the straight-line mode is enabled in response to receiving the request to direct the mobile machine in the straight direction and an absence of a change in the request.

11. The method of claim 10, wherein the adjusted steering command causes a change in a position of a ground-engaging device or a change in a speed of the ground-engaging device in the absence of a request to steer the mobile machine away from the straight direction.

12. The method of claim 11, wherein the orientation sensor is yaw rate sensor or a global navigation satellite system receiver.

13. A machine steering system, comprising:
   a mobile machine having:
      a ground-engaging device; and
      an implement;
      an orientation sensor connected to the mobile machine; and
   an electronic steering correction device configured to:
      receive a steering command to cause the mobile machine to steer in a straight direction, wherein the steering command is received by movement of at least one of a steering wheel, a joystick, a lever, or a pedal, by an operator,
      enable a straight-line mode for generating an adjusted steering command when the steering command indicates an absence of a request to steer the mobile machine away from the straight direction;
      receive, from the orientation sensor, orientation data including an orientation of the machine,
      determine, based on the steering command and the orientation data, that the machine has deviated from the straight direction, and
      generate, with a control unit, based on determining that the machine has deviated from the straight direction, the adjusted steering command to cause the mobile machine to steer in the straight direction without moving the at least one of the steering wheel, the joystick, the lever, or the pedal.

14. The machine steering system of claim 13, wherein the orientation data indicates a change in a yaw of the mobile machine.

15. The machine steering system of claim 13, wherein the electronic steering correction device is further configured to determine an actual direction of travel of the mobile machine based on the orientation data and generate the adjusted steering command based on the actual direction of travel.

16. The machine steering system of claim 13, wherein the electronic steering correction device is further configured to enable the straight-line mode for generating the adjusted steering command when the steering command indicates that a steering device of the mobile machine is in a neutral position.

17. The machine steering system of claim 13, wherein the at least one of the steering wheel, the joystick, the lever, or the pedal is located within a cabin of the mobile machine.

18. The machine steering system of claim 13, wherein the electronic steering correction device is further configured to generate the adjusted steering command while the implement engages material.

19. The machine steering system of claim 13, wherein the electronic steering correction device is further configured to disable the straight-line mode when the at least one of the steering wheel, the joystick, the lever, or the pedal of the mobile machine is moved from a neutral position.

20. The machine steering system of claim 13, wherein the mobile machine is an earthmoving machine or an off-highway hauling machine.

* * * * *